United States Patent [19]

Schinkel et al.

[11] Patent Number: 4,692,386
[45] Date of Patent: Sep. 8, 1987

[54] SEALABLE MULTILAYER POLYOLEFIN FILMS

[75] Inventors: Ingo Schinkel, Walsrode; Jürgen Böhner, Bomlitz, both of Fed. Rep. of Germany

[73] Assignee: Wolff Walsrode Aktiengesellschaft, Walsrode, Fed. Rep. of Germany

[21] Appl. No.: 861,772

[22] Filed: May 9, 1986

[30] Foreign Application Priority Data

May 11, 1985 [DE] Fed. Rep. of Germany ....... 3517082

[51] Int. Cl.$^4$ .................... B32B 27/08; B32B 27/32
[52] U.S. Cl. .................................... 428/515; 428/516; 428/910
[58] Field of Search ................ 428/447, 515, 516, 910

[56] References Cited

U.S. PATENT DOCUMENTS

| 3,645,992 | 2/1972 | Elston | 526/348.2 |
|---|---|---|---|
| 4,011,382 | 3/1977 | Levine et al. | 526/106 |
| 4,198,256 | 4/1980 | Andrews et al. | 428/516 |
| 4,230,767 | 10/1980 | Isaka et al. | 428/516 |
| 4,293,608 | 10/1981 | Isaka et al. | 428/516 |
| 4,348,457 | 9/1982 | Rosenthal et al. | 428/516 |
| 4,400,428 | 8/1983 | Rosenthal et al. | 428/516 |
| 4,619,859 | 10/1986 | Yoshimura et al. | 428/516 |

*Primary Examiner*—William J. Van Balen
*Attorney, Agent, or Firm*—Sprung Horn Kramer & Woods

[57] ABSTRACT

Multiple-layer films, particularly wrapping films, having a high sealing strength at a low sealing temperature flavorable optical properties and machine compatibility based on a film of propylene polymers and at least one linear ethylene copolymer of low density as the heat sealing layer.

10 Claims, No Drawings

SEALABLE MULTILAYER POLYOLEFIN FILMS

This invention relates to heat sealable, oriented muliple polyolefin films, which are particularly suitable for use as wrapping films.

Multiple-layer films of polyolefins, more especially of a polypropylene base layer and a heat-sealable layer of polyethylene or polyethylene copolymers, have been known for some time.

Thus, DE-AS 23 51 923 and EP-SO 002603 describe heat-sealable, oriented multiple-layer films of a polypropylene layer and a heat-sealable layer of a linear, low-density polyethylene copolymer. These multiple-layer films are said to be distinguished by an optically satisfactory appearance of the sealing seams and, in addition, may be produced by coextrusion which is responsible for a broader sealing range. Unfortunately, these multiple-layer films are not suitable for packaging purposes because not only is the sliding behaviour thereof in automotive wrapping machines totally unsatisfactory, but also the inadequate scratch resistance thereof soon leads to packs of unattractive appearance which is an even greater disadvantage.

Accordingly, an object of the present invention is to provide multiple-layer films, particularly wrapping films, which not only can be sealed at a low sealing temperature with a high sealing strength, but also show particularly favourable optical properties and can be used on conventional packaging machines of various types.

The present invention, therefore relates to a heat sealable, at least monoaxially-orientated multiple-layer film consisting of a film of a polymer of propylene as the base layer and at least one heat sealable layer of a combination of (a) from 66.5 to 94.5%, by weight, preferably from 78 to 89.1%, by weight, of a linear, low-density ethylene copolymer (LLDPE);

(b) from 5 to 30%, by weight, preferably from 10 to 20%, by weight, of a low molecular weight resin compatible with the LLDPE with the exception of a low molecular weight resin of a α-olefins containing at most 3 carbon atoms such as polyethylene or polypropylene;

(c) from 0.3 to 2%, by weight, preferably from 0.5 to 1%, by weight, of a mixture of a polyethylene wax and an oxazoline wax;

(d) from 0.2 to 1.5%, by weight, preferably from 0.4 to 1%, by weight, of polydiorganosiloxane; and (e) optionally conventional additives and auxiliaries, wherein the sum of (a) to (d) always amounts to 100% by weight.

The base layer of the sealable multilayer film according to the present invention consists of a propylene polymer containing up to at most 10%, by weight, of another α-olefin containing at most 8 carbon atoms. An isotactic polypropylene having a density of from 0.9 to 0.91 g/cm$^3$ and a melt flow index of from 1 to 4 g/10 minutes at 230° C./21.6N (according to DIN 53 735) is preferably used.

The main consistuent (a) of the sealable layer is a linear statistical, low-density ethylene copolymer consisting of ethylene and up to 12 mole %, preferably from 2 to 8 mole %, of C$_3$-C$_{10}$ α-olefins, preferably propylene, 1-butene, pentene, hexene, octene, nonene, decene or 4-methyl-1-pentene, more preferably 1-butene, hexene of octene; the copolymers are produced under polymerisation conditions under which high density polyethylene is normally obtained, i.e. at low temperature and pressure in the presence of organometallic catalysts. Processes for the production of linear statistical low-density ethylene copolymers are described in U.S. Pat. Nos. 3,645,992 and 4,011,382. The ethylene copolymers used in accordance with the present invention should generally have a density <0.94, preferably from 0.900 to 0.925, more preferably from 0.903 to 0.015 g/cm$^3$.

Natural or synthetic resins having a softening point of from 60° to 180° C., preferably from 80° to 100° C., can be used as the low molecular weight resins compatible with the LLDPE. Compatible resins may be regarded as resins which may be added to the sealing layer in a concentration of up to 30%, by weight, without deterioration in the optical properties of the film. Rosin, dammar resins, turpentine resins, hydrocarbon resins, ketone resins, phenolic resins, chlorinated aliphatic or aromatic hydrocarbon resins may be used as the compatible resins. These resins are described in Ullmanns Encyclopädie der technischen Chemie, Vol. 12, 1976, pages 525 to 555.

Examples of the natural resins are rosin and dammar resins. Rosin is obtained by distilling off turpentine oil from the resins of pines or root stocks. In the context of the present invention, rosin is also to be understood to include rosin esters and also modified rosin, such as dehydrogenated, hydrogenated or fractional rosin.

Dammar resins are also natural resins in the form of colourless to yellow materials which are also obtained by natural resin exudation.

Hydrocarbon resins are polymers of carbon and hydrogen which are obtained in the distillation of coal tar during the cracking of naphtha or gas oil from coke-oven gas or from turpentine oil. Typical examples of such resins are coumarone resins, petroleum resins, terpentene resins, styrene resins, cyclopentadiene resins. Coumarone resins are to be understood to be hydrocarbon resins which are obtained from coke-oven gas or by polymerization of resin-forming compounds of the type encountered in coal tar distillation processes, phenol-modified coumarone resins being obtained by copolymerization.

The raw material base from which the petroleum resins are produced is obtained in the cracking of naphtha or gas oil. Resin-forming compounds ar inter alia butene, butadiene, pentene, piperylene, isoprene, cyclopentadiene, dicyclopentadiene, alkyl benzenes, methyl dicyclopentadiene methyl indene, naphthalene styrene indene, vinyl toluene, methyl styrene.

Low molecular weight homopolymers of styrene and other copolymers, such as α-methyl styrene, vinyl toluene and butadiene, are also suitable low molecular weight resins.

The cyclopentadiene resins are obtained from coal tar distillates and the petroleum gases separated. The polymers are obtained by prolonged exposure of the unsaturated compounds to high temperatures.

The terpene resins are obtained by polymerization of terpenes, such as β-pinene, α-pinene, dipentene, limonene, myncene, bornylene, camphene and similar terpenes.

The chlorinated aliphatic or aromatic hydrocarbons generally contain from 30 to 70%, by weight, of chlorine and are known as chlorine waxes or are derived from biphenyl-chlorine, terphenyl or mixtures thereof.

The hydrocarbon resins mentioned may also be used in the form of modified products in which case modification is possible by copolymerization with certain monomers or by reaction with other polymers, but especially by hydrogenation or partial hydrogenation of the unsaturated constituents of the resin, such as hydrogenated polycyclic hydrocarbon resins of the basis of cyclopentadiene.

Phenolic resins of the type obtained by reaction of phenols and aldehydes are also suitable. In addition to phenol, cresol, xylenol, paraphenylphenol may be condensed with formaldehyde, furfuryl aldhehyde or acetaldehyde.

The sealable layer contains as component (c) a mixture of a polyethylene wax and an oxazoline wax prepared from stearic acid and an amino alcohol. Trishydroxymethylaminomethane is preferably used as the amino alcohol. The ratio in which the two components ar mixed may be varied over a wide range, although they are preferably mixed in a weight ratio of 1:1.

In addition, the sealable layer contains polydiorganosiloxanes or mixtures thereof which generally have a kinematic viscosity at 25° C. of at least 100 mm$^2$/second. Suitable polydiorganosiloxanes are polydialkylsiloxanes, polyalkylphenylsiloxanes, olefin-modified siloxane oils, polyether-modified siloxane oils, olefin/polyether-modified silicone oils, epoxy-modified silicone oils and alcohol-modified silicone oils, polydialkylsiloxanes preferably containing from 1 to 4 carbon atoms in the alkyl group; polydimethylsiloxane is particularly suitable. The polydiorganosiloxanes should preferably have a kinematic viscosity at 25° C. of at least 10$^5$ mm$^2$/second, preferably of at least 10$^6$ mm$^2$/second.

The layers may contain known additives and auxiliaries, such as lubricants, antiblocking agents and antistatic agents, in known quantities. Thus it is possible to use unsaturated fatty acid amides, saturated fatty acid amides, such as stearic acid amide, erucic acid amide, thermoplastic polymers which are incompatible with the polymer of the sealing layer, such as polyamide-12, inorganic antiblocking agents such as $SiO_2$, $CaCO_3$, or antistatic compounds, such as long-chain aliphatic tertiary amines, which may optionally be monunsaturated such as ethoxylated tertiary amines, for example N,N-bis-(2-hydroxyethyl)($C_{12}$-$C_{16}$)-alkylamines.

The multilayer films according to the present invention may be produce by conventional methods, such as coating, lamination or melt (co)extrusion, the combination of which the sealable layer consists being obtainable by the master batch technique but preferably by direct compounding.

The multiple-layer films according to the present invention are at least monoaxially oriented preferabl biaxially. In that case, they are preferably stretched in a ratio of from 5:1 to 7:1 in the longitudinal direction and in a ratio of from 7:1 to 10:1 in the transverse direction.

In the multiple-layer film according to the present invention, the polypropylene base film should preferably have a thickness of from 20 to 50 μm and the heat sealable layer a thickness of preferably from 0.8 to 2 μm, more preferably of 1 μm.

The multiple-layer films according to the present invention are particularly suitable for ue as a packaging material, more particularly as a wrapping film, and thus may be printed and provided with tear-open strips.

In the Examples, the following test methods were used for determining the film properties.

Opacity was determined in accordance with ASTM D 1003-52.

The clarity and gloss of the film were determined using a photoelectric gloss meter after Dr. B. Lange, Berlin, consisting of a low-voltage bulb and a condenser, which illuminate the specimen at 45°, and a second section, at 45° to the measuring plane, with a pinhole diaphram and a photocell. The gloss meter is connected to a finely adjustable indicating instrument (micrommeter) which, in addition, contains the power supply and voltage stabilizer for the bulb. The gloss is defined as the proportion of light normally reflected at 45° in %, based on a surface-silvered mirror as 100% standard. In the gloss test, a polished black glass plate is mounted on the gloss meter as an intermediate standard because the silver mirror standard is not tarnish-resistant in air. It has exactly 5% of the gloss of a surface-silvered mirror. Accordingly, the galvanometer reading of the photocell of the gloss meter is adjusted through the black glass intermediate standard in order to increase the accuracy of reading of the scale graduation by the control potentiometer. The film to be tested is placed flat under the gloss meter on matt-black photographic paper transversely of the direction of travel, based on the optical axis of the gloss meter, and is measured at five satisfactory places. The galvanometer reading is divided by 10 and the average value is determined. The clarity of a film is defined as the proportion of light in % remaining after two passes of the film at 45°, based on the adjustment of the meter to 100% withou tet film. To this end, the gloss meter is placed without a test film on a polished, bright chromium-plated iron plate and the galvanometer reading of the photocell of the gloss meter is adjusted by the control potentiometer to 100 scale units. Five stripes (3×15 cm) are cut longitudinally from the film to be tested by means of a metal template transversely of the film and are placed successively over two 9 mm tall and 29.5 mm wide brass flanges situated at an interval of 23 mm on the chromium-plated iron plate and the gloss meter with its bottom opening is fitted on. The clarity of the film in % may then be directly read from the galvanometer. The average of the individual values is quoted.

To determine the strength of the sealing seams, sealing strength is tested under a low sealing pressure. Sealing strength is to be understood to be the force required to separate a sealing seam formed under defined conditions (0.35N/cm$^2$, 0.5 sec. and the temperatures indicated in the Table). The sealing strength is expressed in Newtons and is based on a 15 mm wide test strip.

To test resistance to scratching, the opaque effect produced by a Ulbricht ball is determined. The opacity of a film is measured before and after scratching. Scratching is carried out using 40 g of dust-free silicon carbide which is strewed in a certain time onto a film inclined at 45° to the horizontal.

EXAMPLES 1 to 4

To produce a multiple-layer film 0.5%, by weight, of polydimethylsiloxane having a kinematic viscosity of 10$^6$ mm$^2$/second, 0.5%, by weight, of a 1:1 mixture of polyethylene wax and an oxazoline wax, 0,15% by weight, of a thermoplastic polyamide-12 as antiblocking agent, 0.2%, by weight, of stearic acid amide, 0.2%, by weight, of erucic acid amide and 0.5%, by weight, of N,N-bis-(2-hydroxyethyl)-($C_{12}$–$C_{16}$)alkylamine and the percentages, by weight, indicated in the following Table of a low molecular weight, hydrogenated polycyclic hydrocarbon resin based on cyclopentadiene (Escorez ® 5000) are incorporated in a linear ethylene copolymer which contains aproximately 4 mol% of copolymerized octene units and which has a density of 0.911 g/cc. The combination thus obtained is used to prepare a heat sealable layer on both surfaces of a base film of polypropylene (density 0.905 g/cm$^3$, melt index 3.3 g/10 mins at 230° C./21.6N; melting range 160°-166° C.) by a conventional method. The composite film longitudinally stretched in a ratio of 5:1 and transversely stretched in a ratio of 10:1 has a thickness of 18 μm for the base layer and a thickness of 1 μm for each of the beat sealing layers.

|  | Example 1 | Example 2 | Example 3 | Example 4* |
|---|---|---|---|---|
| LLPDE (%, by weight) | 95 | 90 | 80 | 100 |
| Hydrocarbon resin (%, by weight) | 5 | 10 | 20 | — |
| Opacity (%) | 1.9 | 1.9 | 1.8 | 1.8 |
| Gloss (GU) | 88 | 88.2 | 89.4 | 88 |
| Clarity (%) | 82.5 | 82.8 | 83.1 | 80.8 |
| Resistance to scratching | 1.0/37.3 | 1.15/25.5 | 1.38/24.3 | 0.7/40.1 |
| Low-pressure sealing Sealing strength (N/15 mm) | | | | |
| 80° C. | 1.4 | 1.6 | 2.0 | 0 |
| 85° C. | 1.9 | 2.0 | 2.1 | 0.8 |
| 90° C. | 2.2 | 2.3 | 2.4 | 1.4 |
| 100° C. | 2.1 | 2.2 | 2.6 | 1.8 |
| 110° C. | 2.1 | 2.2 | 2.2 | 1.8 |

*Comparison Example

We claim:

1. A heat-sealable, at least monoaxially-oriented multiple-layer film which comprises a base layer comprising a polymer of propylene and optionally up to 10%, by weight, of one or more other up to C$_8$ α-olefins and at least one sealable layer comprising:
   (a) from 66.5 to 94.5%, by weight, of a linear, statistical low-density ethylene copolymer (LLDPE);
   (b) from 5 to 30%, by weight, of a low molecular weight resin compatible with (a); with the exception of a low molecular weight resin of α-olefins containing at most 3 carbon atoms;
   (c) from 0.3 to 2%, by weight, of a mixture of a polyethylene wax and an oxazoline wax;
   (d) from 0.2 to 1.5%, by weight, of polydiorganosiloxane.

2. A film as claimed in claim 1 wherein the sealable layer comprises:
   from 78 to 89.1%, by weight, of (a); from 10 to 20%, by weight, of (b); from 0.5 to 1%, by weight, of (c); and from 0.4 to 1%, by weight, of (d).

3. A film as claimed in claim 1 wherein one or more conventional additives or auxiliaries is/are also present as component (e).

4. A film as claimed in claim 1, wherein component (a) is a copolymer of ethylene and up to 12 mol%, preferably from 2 to 8 mol% of C$_3$–C$_{19}$ α-olefins.

5. A film as claimed in claim 4, wherein the C$_3$–C$_{10}$ α-olefin is selected from the group propylene, 1-butene, pentene, hexene, octene, nonene, decene or 4-methyl-1-pentene, preferably 1-butene, hexene or octene.

6. A film as claimed in claim 1, wherein as component (b) a natural or synthetic resin having a softening point of from 60 to 180° C., preferably from 80 to 100° C. is used.

7. A film as claimed in claim 6, wherein Rosin, dammar resins, turpentine resins, hydrocarbon resins, ketone resins, phenolic resins, chlorinated aliphatic or aromatic hydrocarbon resins are used as the compatible resins.

8. A film as claimed in claim 6, wherein a hydrogenated polycyclic hydrocarbon resin based on cyclopentadiene is used.

9. A film as claimed in claim 1, wherein as component (c) a mixture of a polyethylene wax and an oxazoline wax prepared form stearic acid and an amino alcohol, preferably tris-hydroxymethylaminomethane is used.

10. A film as claimed in claim 9, wherein the two components of the mixture are used in a weight ratio of 1:1.

* * * * *